United States Patent
Sano et al.

(10) Patent No.: US 6,434,027 B1
(45) Date of Patent: Aug. 13, 2002

(54) SWITCHING POWER SUPPLY HAVING A PLURALITY OF OUTPUT VOLTAGES AND MINIMAL NUMBER OF TERMINALS

(75) Inventors: Naoto Sano, Otsu; Shingo Kunii, Nagaokakyo; Yasuyuki Morishima, Kyotanabe, all of (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 09/625,714

(22) Filed: Jul. 26, 2000

(51) Int. Cl.$^7$ .............................................. H02M 3/335
(52) U.S. Cl. ...................... 363/21.16; 363/97
(58) Field of Search .................. 307/17, 31, 33, 307/34, 38, 39; 363/15, 16, 18, 19, 20, 21.01, 21.08–21.1, 21.15–21.18, 97

(56) References Cited

U.S. PATENT DOCUMENTS

| | | | | |
|---|---|---|---|---|
| 3,758,823 A | * | 9/1973 | Jett et al. ...................... | 315/219 |
| 4,024,434 A | * | 5/1977 | Joosten et al. ............... | 315/410 |
| 4,737,898 A | * | 4/1988 | Banfalvi ...................... | 363/19 |
| 4,937,728 A | * | 6/1990 | Leonardi ...................... | 363/97 |
| 5,701,238 A | * | 12/1997 | Weidinger et al. ............ | 363/16 |
| 5,925,278 A | * | 7/1999 | Hirst ........................... | 219/662 |

FOREIGN PATENT DOCUMENTS

| | | |
|---|---|---|
| JP | 444334 | 2/1944 |
| JP | 5652737 | 12/1981 |
| JP | 8223909 | 8/1996 |

* cited by examiner

Primary Examiner—Edward H. Tso
Assistant Examiner—Gary L. Laxton
(74) Attorney, Agent, or Firm—Ostrolenk, Faber, Gerb & Soffen, LLP

(57) ABSTRACT

A switching power supply which is capable of generating several different output voltages and which can be easily miniaturized by using a transformer with a small number of terminals. For example, using a transformer with four terminals and three windings that are connected in series, a rectifying-smoothing circuit having a diode and a capacitor is connected to a connection point of the collector of a switching transistor and the windings. A further pair of rectifying-smoothing circuits having diodes and capacitors is commonly connected to one end of the windings, according to one example. As a result thereof, three voltages are generated.

10 Claims, 7 Drawing Sheets

SWITCHING POWER SUPPLY HAVING A PLURALITY OF OUTPUT VOLTAGES AND MINIMAL NUMBER OF TERMINALS

BACKGROUND OF THE INVENTION

1. Field of the Invention

The present invention relates to a DC/DC converter and the like, and more particularly to a multi-output switching power supply.

2. Description of the Related Art

Conventionally, for example, in digital equipment such as a computer and a display device thereof, several power-supply voltages are used. In order to supply several power-supply voltages, a composite power supply may be made by combining a plurality of single output switching power supplies. However, for a relatively small output power supply, the overall size becomes large and the cost becomes high in spite of the small output capacity. Accordingly, in a power supply that is integrated into equipment requiring several power-supply voltages, a multi-output type switching power supply is used, which is configured to provide several output voltages with a single power conversion circuit.

FIG. 11 shows an example of a conventional circuit of a typical multi-output type switching power supply. In the figure, T represents a transformer having five windings L1, L2, L21, L22, and L23. L1 represents an input winding, L2 represents a feedback winding, and each of L21, L22, and L23 represents an output winding. A switching transistor Q1 is connected to one end of the winding L1, and an input voltage Vin is applied to the other end of the winding L1 from terminal Vin. A feedback circuit constituted of a capacitor C1 and a resistor R2 is provided between the feedback winding L2 and a base of the switching transistor Q1. A rectifying-smoothing circuit constituted of rectifying diodes D11 to D13 and smoothing capacitors C11 to C13 is connected to the output windings L21 to L23. As a result, different output voltages are generated at each of V1 to V3 output terminals.

With the miniaturization of electronic equipment in recent years, there is an increasingly strong demand for miniaturization of the power supply that is integrated into the electronic equipment. For miniaturization of a switching power supply, a transformer that is a main part thereof must be miniaturized. However, there is a problem in that many terminals cannot be provided therewith even though the main part of the transformer may be miniaturized to some extent. For example, in a miniaturized transformer with a low output, the number of terminals is limited to four.

However, in the case of the multi-output type switching power, as shown in FIG. 11, for example, in order to output three different voltages, it is required that the transformer is provided with seven terminals, and as a result, the transformer cannot be miniaturized, thus preventing miniaturization of the multi-output type switching power supply.

SUMMARY OF THE INVENTION

Accordingly, it is an object of the present invention to provide a switching power supply which is capable of generating many different output voltages and which can be easily miniaturized by using a transformer with a small numbers of terminals.

The above-mentioned object of the present invention can be achieved by a switching power supply including a transformer provided with at least two windings connected in series and no more than four terminals, a switching element for interrupting a current of an input winding of the transformer, a feedback circuit for providing a feedback signal from a feedback winding of the transformer to a control terminal of the switching element, a rectifying-smoothing circuit for rectifying and smoothing an induced voltage of an output winding of the transformer, and a plurality of rectifying smoothing circuits commonly connected to a predetermined terminal of said transformer so as to generate three or more different output voltages.

With this configuration, three or more different output voltages can be generated using a transformer with four or fewer terminals, thereby obtaining a compact switching power supply using a compact transformer.

The above-mentioned object of the present invention can be achieved by a switching power supply including a transformer provided with at least two windings connected in series and no more than four terminals, a switching element for interrupting a current of an input winding of the transformer, a feedback circuit for providing a feedback signal from a feedback winding of the transformer to a control terminal of the switching element, a rectifying-smoothing circuit for rectifying and smoothing an induced voltage of an output winding of the transformer, and rectifying-smoothing circuits connected to the feedback winding, which is connected to the feedback circuit, and to other windings, respectively, so as to generate three or more different output voltages. Thus, the feedback winding is also used for the output winding by connecting the rectifying-smoothing circuits to the feedback winding that is connected to the feedback circuit.

Usually, since the ratio of the number of turns of the feedback winding to the input winding can be made equal to or less than 1, a lower voltage can be obtained at an output side of a rectifying-smoothing circuit that is connected to the feedback winding than an output voltage that is generated by interruption of a current for the input winding and by an inductance of that input winding, thereby providing a switching power supply that generates a wide range of output voltages.

Further objects and advantages of the invention can be more fully understood from the following detailed description taken in conjunction with the accompanying drawings.

BRIEF DESCRIPTION OF THE DRAWING(S)

DETAILED DESCRIPTION OF EMBODIMENTS OF THE INVENTION

The configuration of a switching power supply according to a first embodiment of the present invention will be described with reference to FIGS. 1 and 2.

Figure 1:
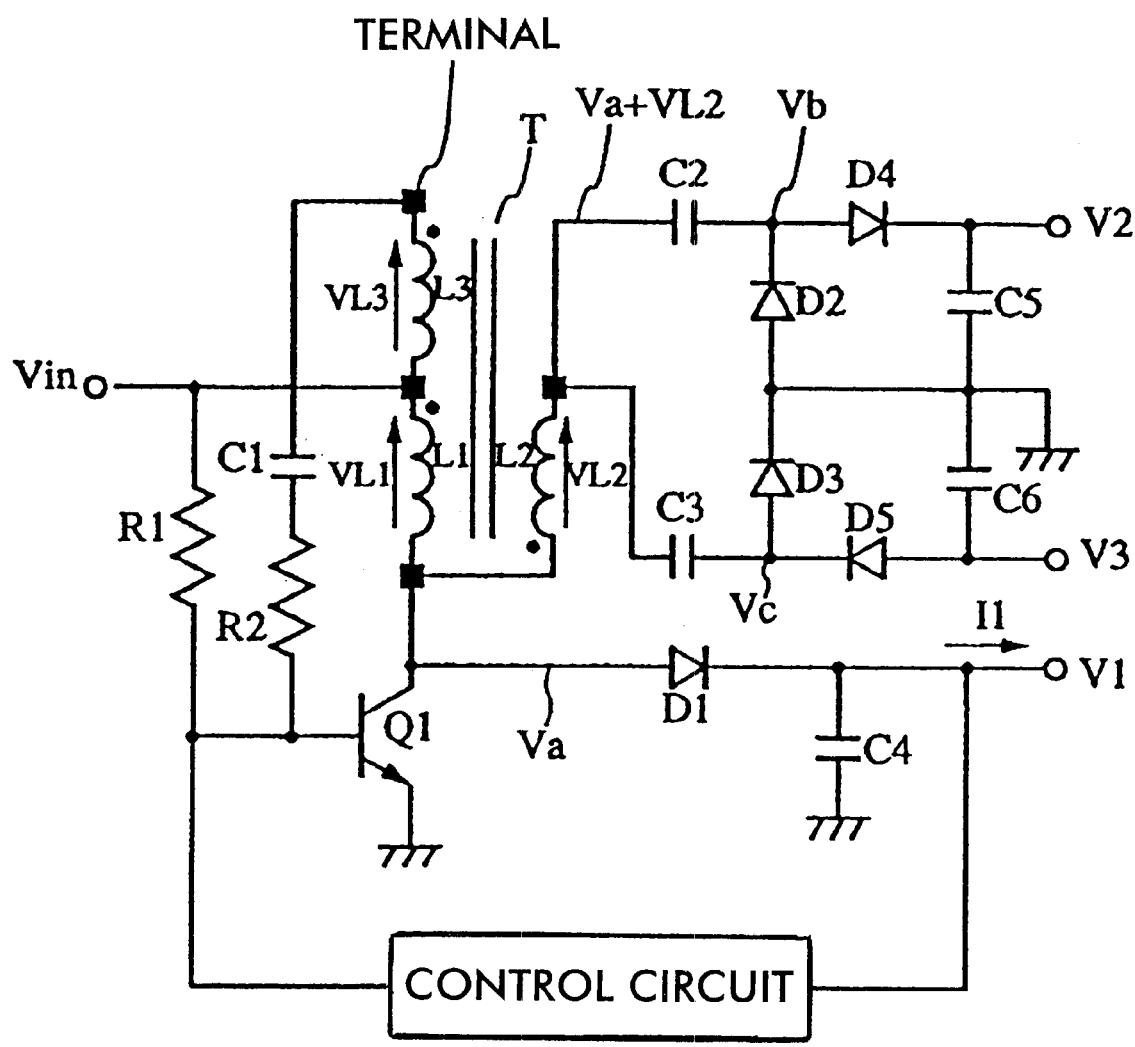
FIG. 1 is a diagram showing a circuit of a switching power supply according to a first embodiment of the present invention.

In FIG. 1, T represents a transformer with four terminals, in which there are three windings L1, L2, and L3, and in which both ends of each winding are established as terminals. The relationship among these windings L1, L2, and L3 is that they are connected in series with the same polarity. Accordingly, the transformer T is configured in such a manner that these windings L1 to L3 are continuously wound, and taps in between are set as each of the terminals.

Herein, it is so arranged that the winding L1 is used as an input winding, a switching transistor Q1 is connected to one end thereof, and an input voltage Vin is applied to the other end thereof from a Vin terminal. The winding L3 is used as a feedback winding, and a feedback circuit constituted of a capacitor C1 and a resistor R2 is provided between the other end of the winding L3 and a base of the switching transistor Q1. Furthermore, a resistor R1 for starting is connected between the Vin input terminal and the base of the switching transistor Q1. A rectifying-smoothing circuit constituted of a diode D1 and a capacitor C4 is provided between output terminal V1 and a connection point of a collector of the switching transistor Q1 and the winding L1.

Further, the winding L2 is used as an output winding in which a voltage is induced by excitation of the input winding L1. Two pairs of rectifying-smoothing circuits constituted of capacitors C2, C3, C5, and C6 and diodes D2, D3, D4, and D5 are provided between the other end of the winding L2 and V2 and V3 output terminals.

In FIG. 1, at first when the input voltage Vin is inputted, a base current flows into the switching transistor Q1 through the resistor R1, and then the switching transistor Q1 starts to conduct. At this moment, a voltage is induced in the winding L3 by excitation of the winding L1, and a positive feedback is applied through the capacitor C1 and the resistor R2, so that a collector current of the switching transistor Q1 is increased. Thereafter, the collector current of the switching transistor Q1 is limited (saturated) to the base current, which is determined by the resistor R1, multiplied by the (a current amplitude factor), and the rate of current increase of the current that flows into the winding L1 decreases. As a result, an induced voltage of the opposite polarity is generated in the winding L3, and then the switching transistor Q1 is turned off rapidly by the action of the feedback circuit with the capacitor C1 and the resistor R2. Thereafter, if the excitation energy of the winding L1 is entirely released to the output side thereof, then it returns to an initial state. An oscillating operation is continuously maintained by repeating the above-described operation.

Figure 2:
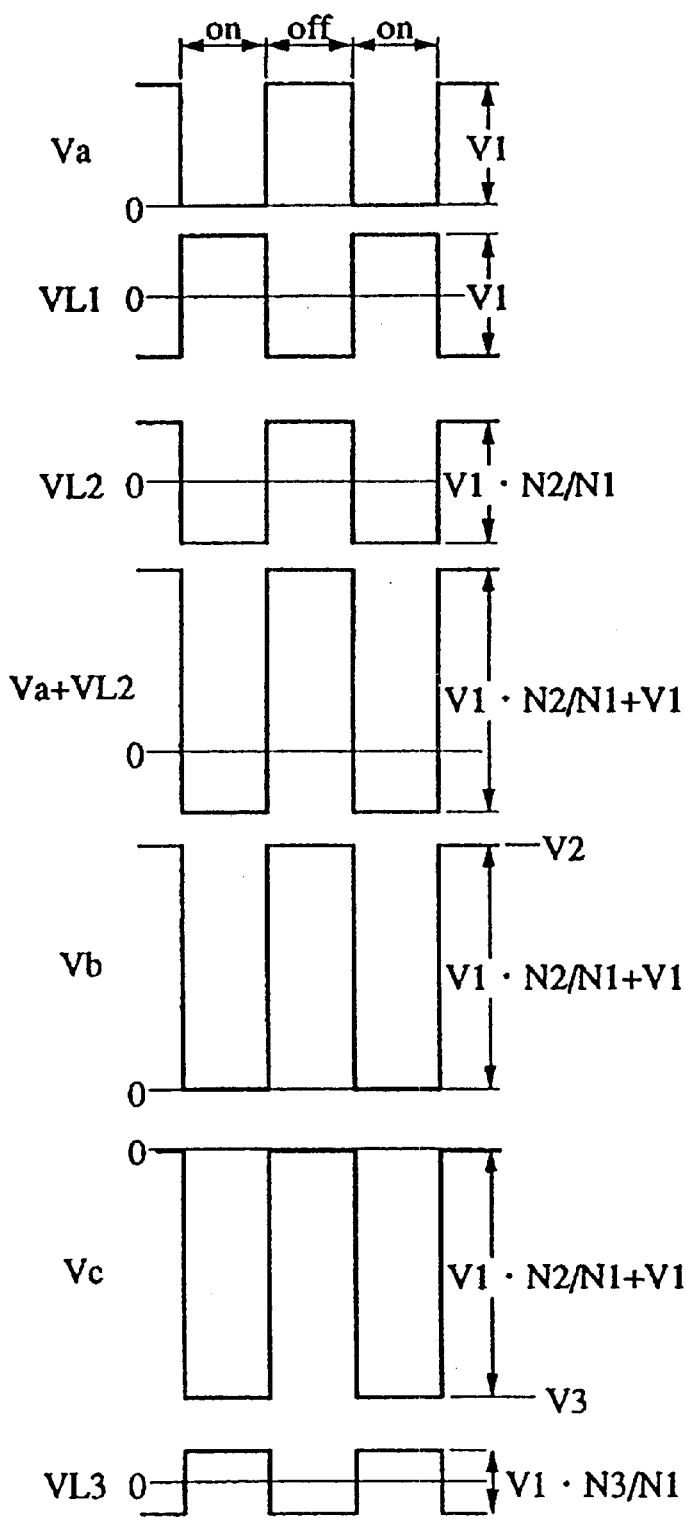
FIG. 2 is a diagram showing a waveform at each part in the switching power supply of FIG. 1.

FIG. 2 is a diagram showing the waveforms at the respective parts in FIG. 1. Herein, Va represents a voltage waveform across the collector-emitter of the switching transistor Q1, and becomes a rectangular wave by the on/off switching operation of the switching transistor Q1. An amplitude V1 of this voltage Va is determined by the operational principle of a step-up type DC/DC converter. That is, V1 is determined by a load current I1 flowing from the V1 output terminal to a load, the inductance of the winding L1, the input voltage Vin, and the on-time and off-time of the switching transistor Q1.

In FIG. 2, VL1 and VL2 represent voltages across both-ends of the windings L1 and L2, respectively, with VL1 being varied in amplitude by V1, and VL2 being varied in amplitude by V1 multiplied by N2/N1. Herein, N1 represents the number of windings of the winding L1 and N2 represents the number of windings of the winding L2. Similarly, the number of windings of the winding L3 is represented by N3. (These relations are the same in other embodiments described below). A voltage at a connection point between the winding L2 and the capacitor C2 is Va+VL2, and it varies in amplitude by V1·N2/N1+V1. Then, when the switching transistor Q1 is turned off, a cathode potential Vb of the diode D2 is biased by a voltage that is charged in the capacitor C2 when the switching transistor Q1 is turned on so that the peak voltage thereof becomes V1·N2/N1+V1, as shown in FIG. 2. Accordingly, an output voltage of the V2 output terminal becomes V1·N2/N1+V1.

The rectifying-smoothing circuit between the winding L2 and the V3 output terminal is arranged to be a circuit with an opposite polarity compared to the rectifying-smoothing circuit between the winding L2 and the V2 output terminal, so that the output voltage V3 at the V3 output terminal becomes a voltage with a polarity opposite to that of V2.

Incidentally, a voltage VL3 across both-ends of the feedback winding L3 becomes V1·N3/N1, as shown in FIG. 2. Further, in FIG. 2, a voltage between the collector and the emitter when the switching transistor Q1 is turned off, as well as a drop voltage in a forward direction of the diodes, are substantially set to 0 (zero).

In this way, three output voltages V1, V2, and V3 are obtained. Further, the control circuit shown in FIG. 1 controls the base-bias of the switching transistor Q1 in a direction in which the voltage thereof is stabilized by detecting the output voltage V1. As a result thereof, the input voltage Vin is stably controlled.

Figure 3:
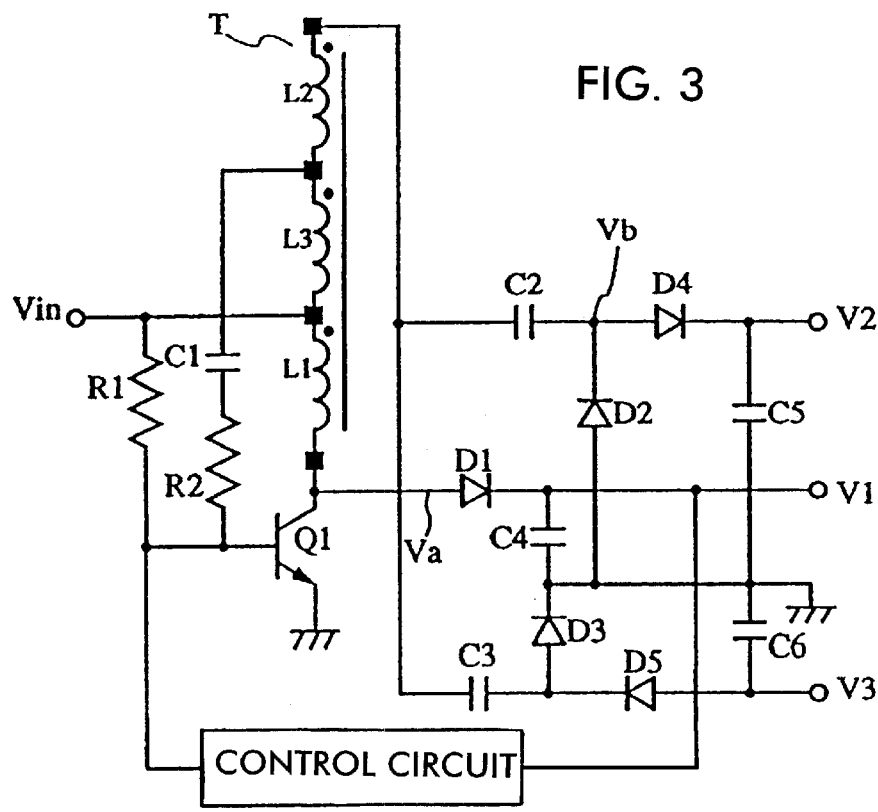
FIG. 3 is a diagram showing a circuit of a switching power supply according to a second embodiment of the present invention.

In FIG. 3, the configuration of a switching power supply according to a second embodiment of the present invention is shown. Differing from the embodiment shown in FIG. 1, in the embodiment shown in FIG. 3, it is arranged that windings of a transformer T are connected in series, in the order of L1, L3 and L2, and two rectifying-smoothing circuits are connected to the end of the winding L2. In this case, three windings are also wound continuously, and taps in-between can also be used as terminals.

In FIG. 3, when setting the voltages across both-ends of the windings L1, L3, and L2 to VL1, VL3, and VL2, respectively, a potential at a connection point of the winding L2 and the capacitor C2 becomes Va+VL1+VL3+VL2 when the switching transistor Q1 is turned off. However, since the potential at the connection point of the windings L1 and L3 is Vin and is constant, the range of the voltage change by an interruption of the switching transistor Q1 becomes V1·(N1+N3)/N1. Accordingly, a peak voltage of a cathode potential Vb of a diode D2 becomes V1·(N2+N3)/N1, and an output voltage V2 at a V2 output terminal becomes V1·(N2+N3)/N1. An output voltage V3 is a voltage with polarity opposite to that of V2, similarly to the case in FIG. 1.

Figure 4:
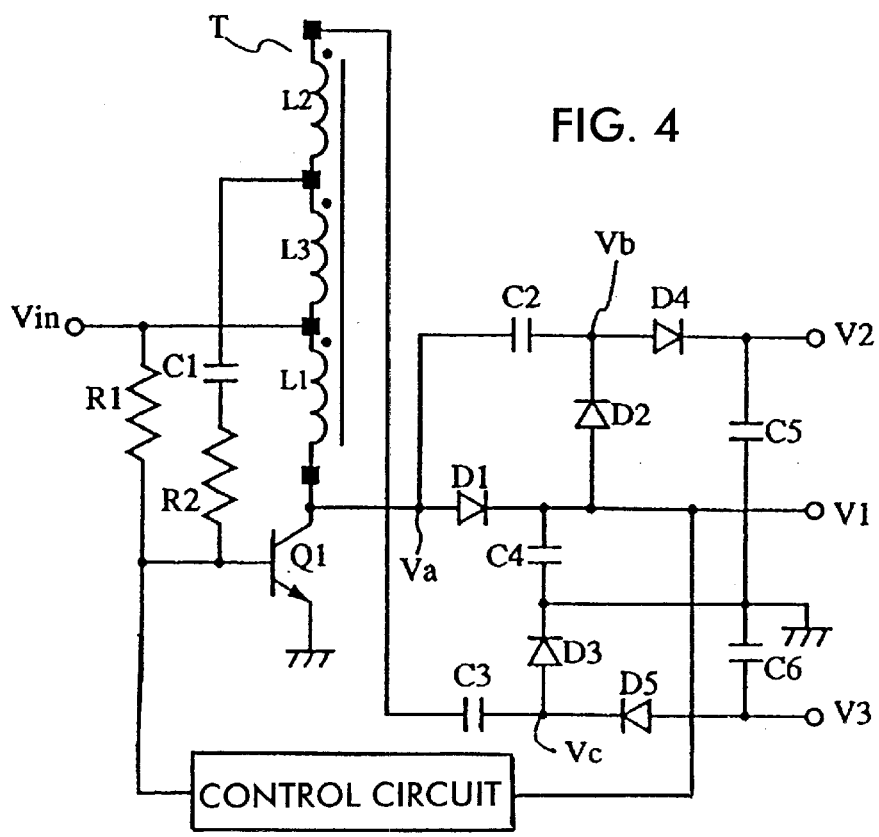
FIG. 4 is a diagram showing a circuit of a switching power supply according to a third embodiment of the present invention.

FIG. 4 is a diagram showing a circuit of a switching power supply according to a third embodiment of the present invention. Differing from the embodiment shown in FIG. 3, one end of capacitor C2 is connected to a connection point of a collector of a switching transistor Q1 and a winding L1, and an anode of a diode D1 is connected to output terminal V1. According to this configuration, when the switching transistor Q1 is turned on, a voltage V1 of a capacitor C4 charges a capacitor C2 in a reversed direction through a diode D2, and when the switching transistor Q1 is turned off, Va becomes V1, so that a voltage V1+V1, i.e., 2V1 is charged in a capacitor C5, and the voltage of 2V1 is outputted from a V2 output terminal. The voltages outputted from the V1 and V3 output terminals are the same as the case in FIG. 3.

Figure 5:
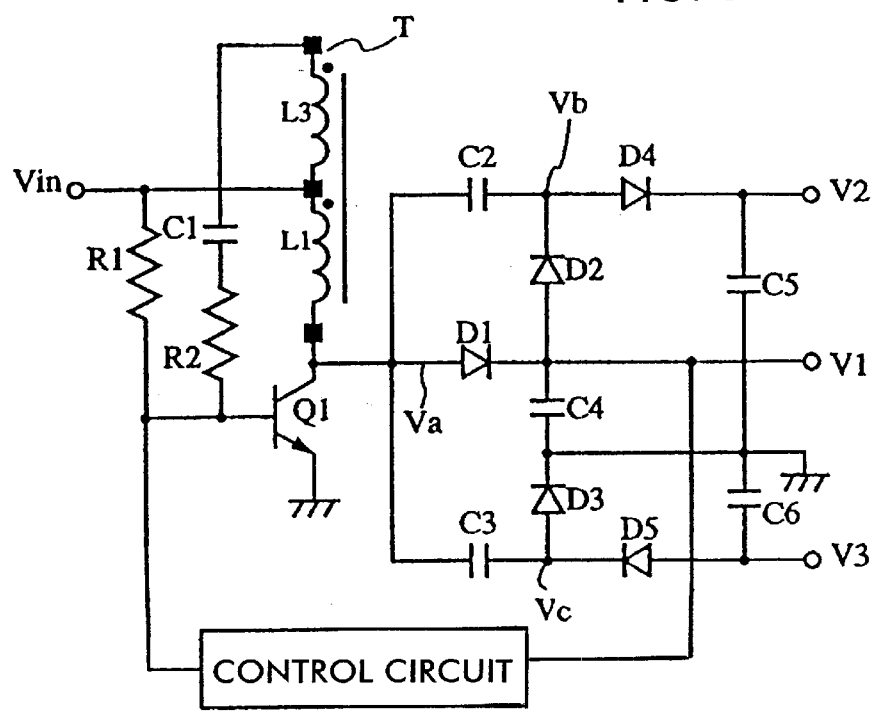
FIG. 5 is a diagram showing a circuit of a switching power supply according to a fourth embodiment of the present invention.

FIG. 5 is a diagram showing a circuit of a switching power supply according to a fourth embodiment of the present invention. In this example, a three-terminal transformer T constituted of two windings L1 and L3 is used. Herein, a rectifying-smoothing circuit constituted of capacitors C3 and C6, and diodes D3 and D5 is provided between an output terminal V3 and a connection point of the collector of switching transistor Q1 and winding L1. Accordingly, when the switching transistor Q1 is turned off, a voltage V1 is charged in the capacitor C3 through a path from C3 to D3, and because one end of the capacitor C3 is grounded when the switching transistor Q1 is turned on, the voltage $-V1$ is outputted from the output terminal V3.

The circuit from the transformer T to V1 and V2 output terminals is the same as the case in FIG. 4, and a voltage of 2V1 is outputted from an output terminal V2.

In the following, the configuration of a switching power supply according to a fifth embodiment of the present invention will be described with reference to FIGS. 6 and 7. The fifth and following embodiments are different from the embodiments shown in FIGS. 1 to 5 in that a feedback winding L3 is also used as an output winding.

Figure 6:
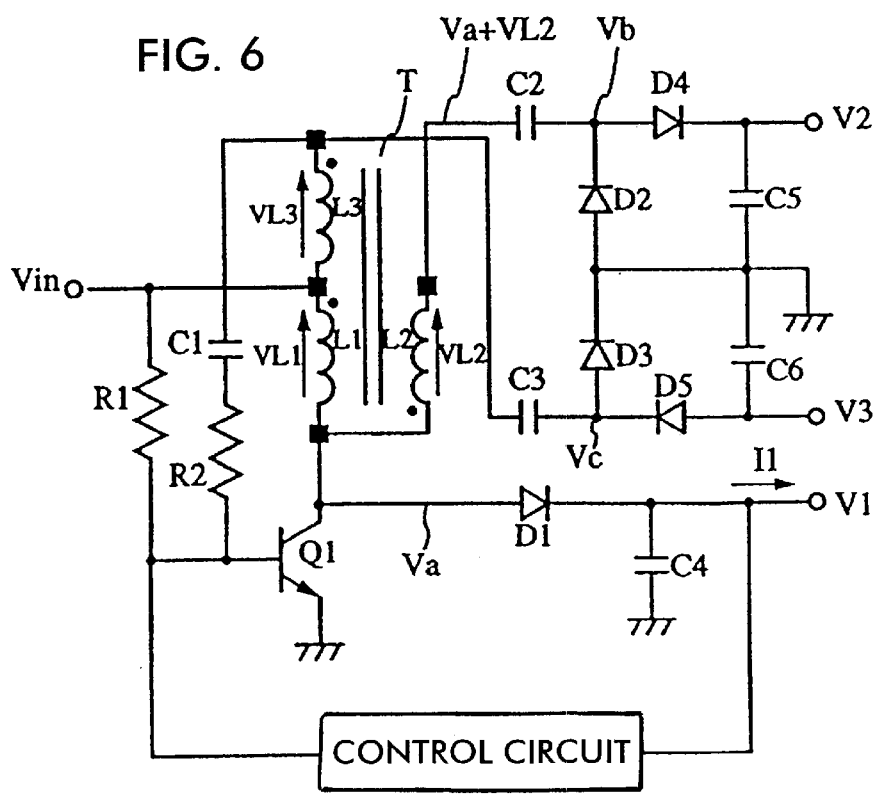
FIG. 6 is a diagram showing a circuit of a switching power supply according to a fifth embodiment of the present invention.
Figure 7:
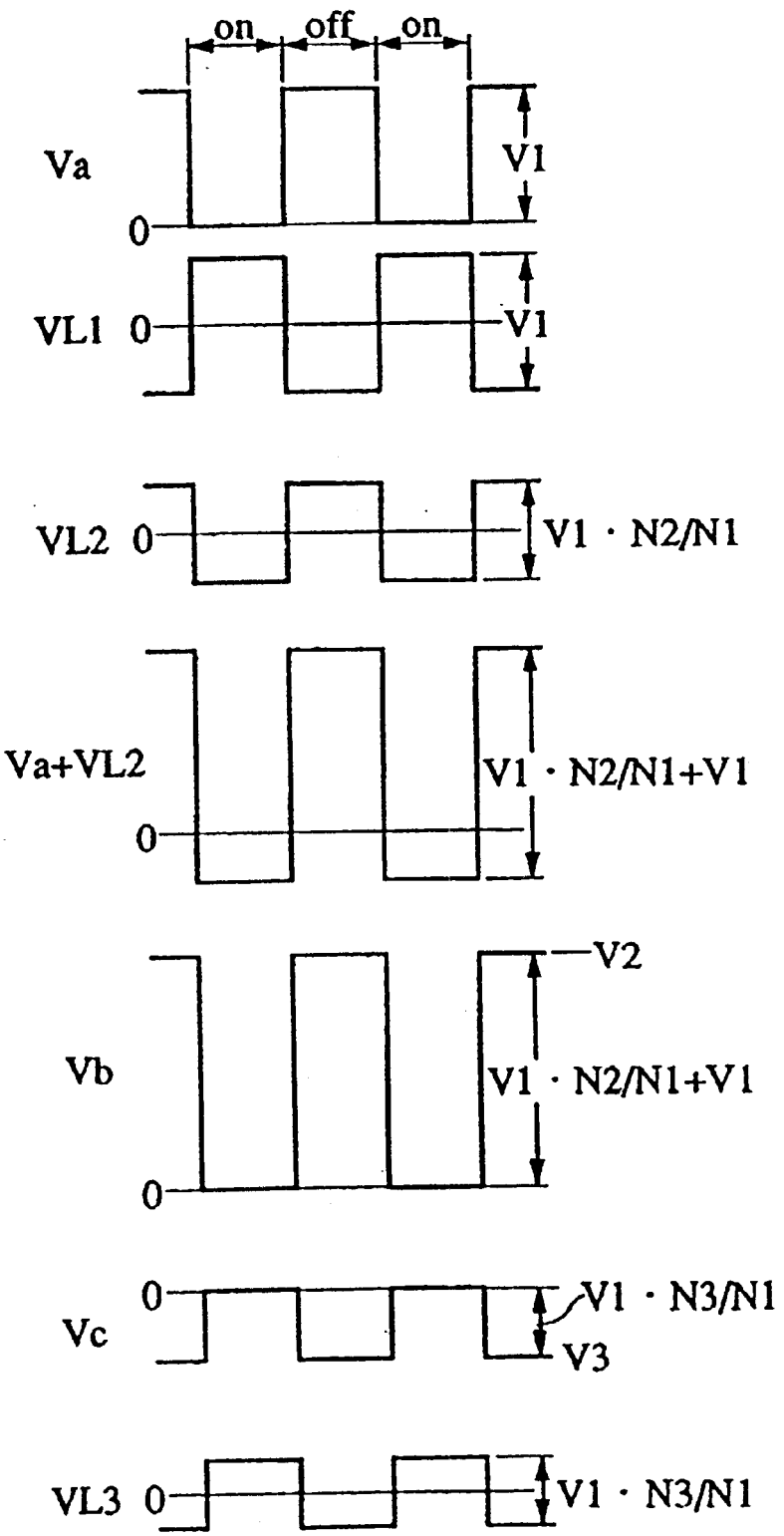
FIG. 7 is a diagram showing a waveform at each part in the switching power supply of FIG. 6.

FIG. 6 is a circuit diagram, and FIG. 7 is a diagram showing the voltage waveforms at the respective parts thereof.

In the example shown in FIG. 6, one end of a capacitor C3 is connected to one end of a feedback winding L3. Accordingly, a voltage at a connection point of the winding L3 and the capacitor C3 becomes Va+VL1+VL3. However, because Va+VL1=Vin and is constant, an anode potential Vc of a diode D3 will move in the range of the change of VL3. Since this amplitude is $V1\cdot N3/N1$, a voltage of $-V1\cdot N3/N1$ is outputted from output terminal V3. In general, the ratio of the number of turns of the feedback winding L3 to the input winding L1 can be made equal to or less than 1, so that the absolute value of V3 can be made less than the absolute value of V1. The configuration between the terminals of the transformer and the V1 and V2 output terminals is the same as the case in FIG. 1, and the output voltage V2 of the V2 output terminal becomes $V1\cdot N2/N1+V1$.

Figure 8:
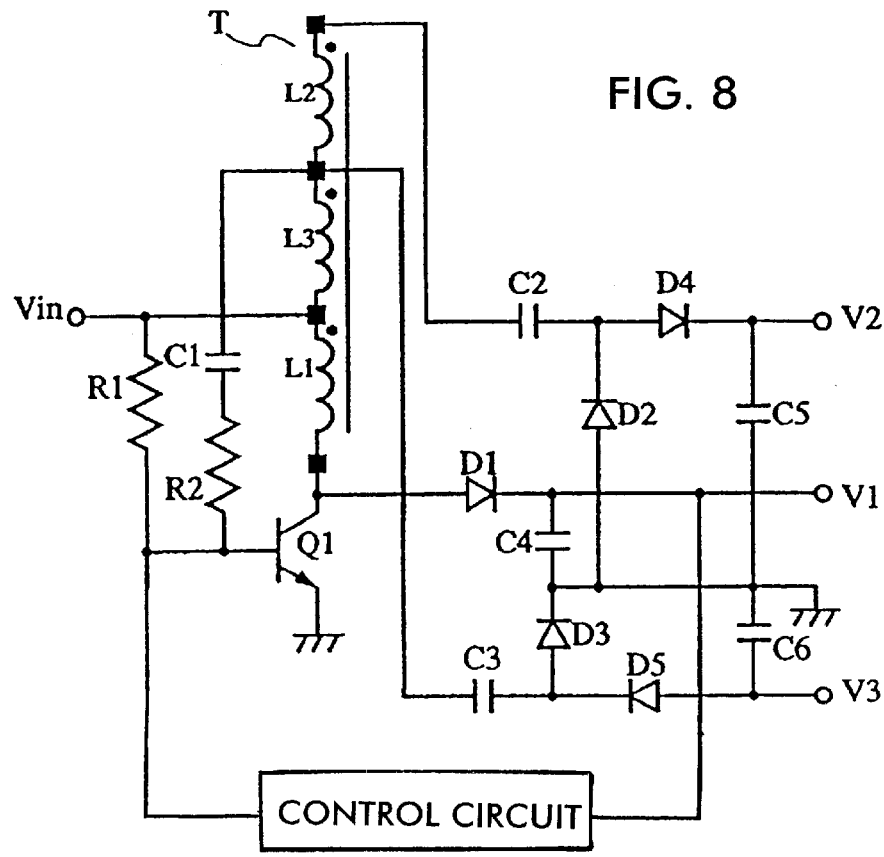
FIG. 8 is a diagram showing a circuit of a switching power supply according to a sixth embodiment of the present invention.

FIG. 8 is a diagram showing a circuit of a switching power supply according to a sixth embodiment of the present invention. In this example, one end of a capacitor C3 is connected to a connection point of windings L3 and L2. Accordingly, the output voltage outputted from output terminal V3 is $-(N3/N1)\cdot V1$. The configuration between terminals of transformer T and output terminals V1 and V2 is the same as the case in FIG. 3, and output voltages thereof also are the same.

Figure 9:
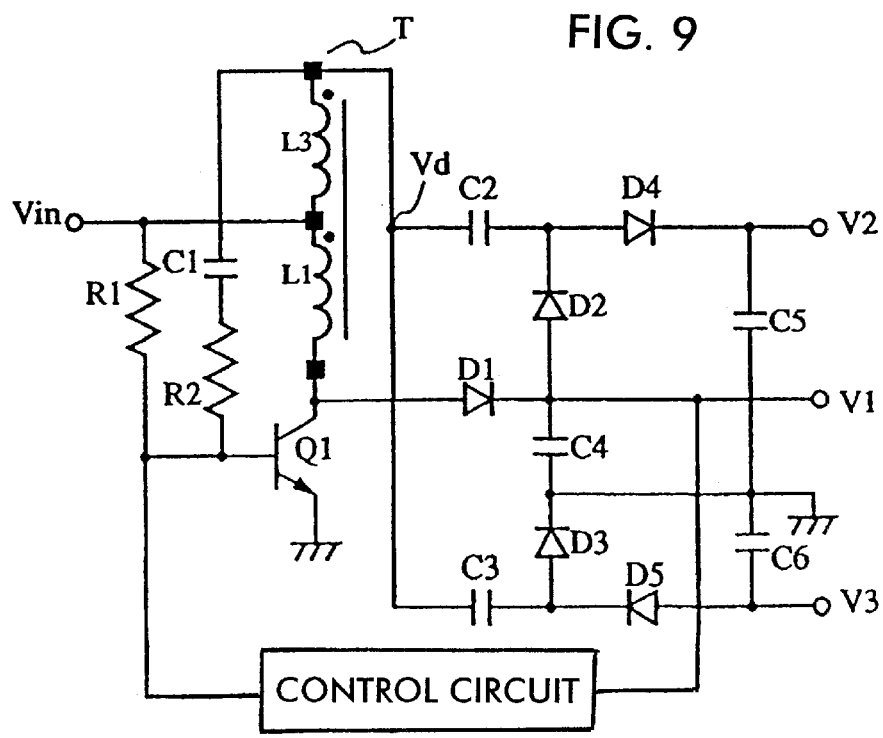
FIG. 9 is a diagram showing a circuit of a switching power supply according to a seventh embodiment of the present invention.

FIG. 9 is a diagram showing a circuit of a switching power supply according to a seventh embodiment of the present invention. Differing from the example shown in FIG. 5, one end of each of capacitors C2 and C3 is connected to one end of a winding L3. As a result thereof, a potential Vd at a connection point of the winding L3 and the capacitor C2 varies in amplitude by $V1\cdot N3/N1$. Since an anode of a diode D2 is connected to a V1 output terminal, a voltage $V1+V1\cdot N3/N1$ is eventually charged in a capacitor CS, and that voltage is outputted from a V2 output terminal. On the other hand, because a cathode of a diode D3 is grounded, a voltage change of the above-mentioned Vd is outputted from V3 output terminal with an opposite polarity. That is, a voltage of $-V1\cdot N3/N1$ is outputted.

Figure 10:
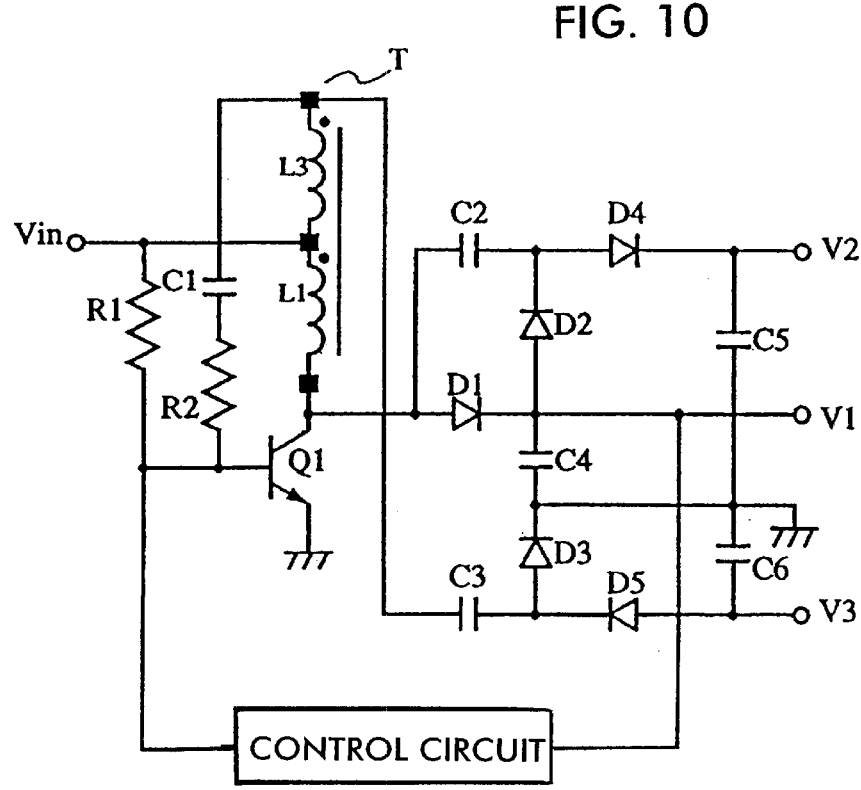
FIG. 10 is a diagram showing a circuit of a switching power supply according to an eighth embodiment of the present invention.
Figure 11:
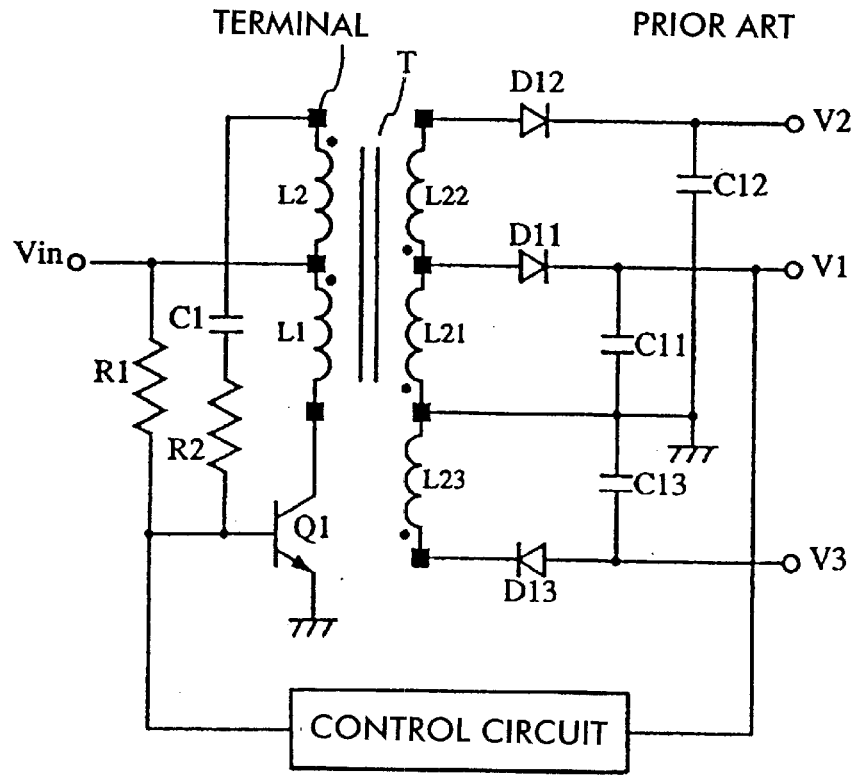
FIG. 11 is a diagram showing a circuit of a conventional switching power supply.

FIG. 10 is a diagram showing a circuit of a switching power supply according to an eighth embodiment of the present invention. Differing from the example of FIG. 9, one end of a capacitor C2 is connected to a connection point of the collector of a switching transistor Q1 and the winding L1. The configuration of this part is the same as the one in FIG. 5, and an output voltage V2 at output terminal V2 becomes 2V1. Further, an output voltage V3 at output terminal V3 becomes $-V1\cdot N3/N1$ that is the same as the case in FIG. 9.

According to the present invention as described above, three or more output voltages with different voltages can be generated, using a transformer having four or less terminals, thereby obtaining a compact switching power supply using a compact transformer.

Further, a lower voltage can be provided at an output side of a rectifying-smoothing circuit that is connected to a feedback winding than an output voltage that is generated by interruption of a current for an input winding and by the inductance of that input winding. Thereby a switching power supply that generates a wide range of output voltages can be provided.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A switching power supply comprising:

a transformer comprising at least three windings connected in series and no more than four terminals, said transformer having an input winding, an output winding and a feedback winding;

a switching element having two main terminals for interrupting a current of one input winding of said transformer;

a feedback circuit for providing a feedback signal from the feedback winding of said transformer to a control terminal of said switching element;

a first rectifying-smoothing circuit for rectifying and smoothing an induced voltage of the output winding of said transformer; and a plurality of second rectifying-smoothing circuits commonly connected to a predetermined terminal of said transformer;

whereby at least three different output voltages are generated.

2. A switching power supply, comprising:

a transformer comprising at least three windings connected in series and no more than four terminals, said transformer having an input winding, an output winding and a feedback winding;

a switching element having two main terminals for interrupting a current of the input winding of said transformer;

a feedback circuit coupled to the feedback winding of the transformer for providing a feedback signal from the feedback winding to a control terminal of said switching element;

a first rectifying-smoothing circuit for rectifying and smoothing an induced voltage of the output winding of said transformer; and at least two second rectifying-smoothing circuits connected to said feedback winding;

whereby at least three different output voltages.

3. A DC-DC converter comprising:

a transformer having an input winding an output winding and a feedback winding which are connected in series with each other and having no more than four terminals;

a switching element having a control terminal and being connected to the input winding, the switching element interrupting a current flowing in the input winding;

a feedback circuit connected to the feedback winding, the feedback circuit providing a feedback signal from the feedback winding of said transformer to the control terminal of the switching element;

a first rectifying-smoothing circuit connected to a connection point of the input winding and the switching element, the first rectifying-smoothing circuit outputting a first output voltage; and second and third rectifying-smoothing circuits connected to the transformer, the second and third rectifying-smoothing circuit having opposite polarities with each other and outputting second and third output voltages.

4. A switching power supply comprising:

a transformer comprising at least three windings connected in series and no more than four terminals, said transformer having an input winding, an output winding and a feedback winding;

a switching element having two main terminals for interrupting a current of the input winding of said transformer;

a feedback circuit coupled to the feedback winding of the transformer for providing a feedback signal from the feedback winding to a control terminal of said switching element;

a first rectifying-smoothing circuit for rectifying and smoothing an induced voltage of the output winding of said transformer; and a plurality of second rectifying-smoothing circuits connected to said feedback winding, said feedback winding also acting as an output winding;

whereby at least three different output voltages are generated.

5. The switching power supply of claim 1, wherein the plurality of second rectifying-smoothing circuits are commonly connected to a terminal of the output winding of said transformer, said terminal of the output winding not being directly connected to a main terminal of the switching element.

6. The switching power supply of claim 1, wherein said first rectifying-smoothing circuit is coupled to a terminal of the output winding of said transformer, said terminal of the output winding not being directly connected to a main terminal of the switching element.

7. The switching power supply of claim 6, wherein the plurality of second rectifying-smoothing circuits are commonly connected to a common connection of the switching element and the input winding of the transformer.

8. The switching power supply of claim 1 wherein the first and second rectifying-smoothing circuits are coupled to the same predetermined terminal of the transformer.

9. The switching power supply of claim 8, wherein the predetermined terminal comprises a common connection of the switching element and the input winding.

10. The switching power supply of claim 2, wherein the first rectifying-smoothing circuit is connected to a terminal of the output winding of the transformer, the terminal of the output winding not being directly connected to a main terminal of the switching element, and the plurality of second rectifying-smoothing circuits are connected to a main terminal of the switching element.

* * * * *